(12) United States Patent
Sekine

(10) Patent No.: US 9,979,165 B2
(45) Date of Patent: May 22, 2018

(54) BUS BAR USED FOR FUEL CELL SYSTEM

(71) Applicant: TOYOTA JIDOSHA KABUSHIKI KAISHA, Toyota-shi, Aichi-ken (JP)

(72) Inventor: Hiroyuki Sekine, Nisshin (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days. days.

(21) Appl. No.: 15/595,014

(22) Filed: May 15, 2017

(65) Prior Publication Data
US 2017/0346262 A1 Nov. 30, 2017

(30) Foreign Application Priority Data

May 31, 2016 (JP) .................. 2016-108030

(51) Int. Cl.
*H02B 1/20* (2006.01)
*B60R 16/023* (2006.01)
*H02M 7/5387* (2007.01)

(52) U.S. Cl.
CPC ............. *H02B 1/20* (2013.01); *B60R 16/023* (2013.01); *H02M 7/5387* (2013.01)

(58) Field of Classification Search
CPC ....... H02M 7/003; H02B 1/205; H02B 1/207; H02B 1/20
See application file for complete search history.

(56) References Cited

U.S. PATENT DOCUMENTS

| 8,665,623 B2* | 3/2014 | Suzuki | H02M 7/003 363/141 |
| 9,107,318 B2* | 8/2015 | Hida | H05K 7/20927 |
| 2016/0020707 A1* | 1/2016 | Fukumasu | H02M 7/003 363/131 |

FOREIGN PATENT DOCUMENTS

JP 2015-220961 12/2015

* cited by examiner

*Primary Examiner* — Gary L Laxton
(74) *Attorney, Agent, or Firm* — Finnegan, Henderson, Farabow, Garrett & Dunner, LLP

(57) ABSTRACT

There is provided a bus bar used for a fuel cell system that comprises a fuel cell; an FC boost-up converter configured by a DC-DC converter to boost up a voltage output from the fuel cell; and an inverter connected with the FC boost-up converter. The bus bar comprises a first bus bar connected with a negative terminal of the fuel cell; a second bus bar connected with a negative terminal of the FC boost-up converter; and a third bus bard connected with a negative terminal of the inverter. The second bus bar is directly coupled with the first bus bar, and the third bus bar is directly coupled with the first bus bar. The second bus bar is configured to have a smaller sectional area than a sectional area of the first bus bar.

3 Claims, 5 Drawing Sheets

BUS BAR USED FOR FUEL CELL SYSTEM

CROSS-REFERENCE TO RELATED APPLICATIONS

The present application claims priority from Japanese patent application 2016-108030 filed on May 31, 2016, the entirety of the content of which is hereby incorporated by reference into this application.

BACKGROUND

Field

The present disclosure relates to a bus bar used for a fuel cell system.

Related Art

JP 2015-220961A discloses a fuel cell system that is mounted on a vehicle and includes a fuel cell; an FC boost-up converter (hereinafter may be simply called "boost-up converter") configured to boost up a voltage output from the fuel cell; and an inverter configured to receive a supply of the boosted-up voltage output from the boost-up converter.

In the fuel cell system described above, a negative terminal of the fuel cell and a negative terminal of the boost-up converter are electrically connected with each other by using a bus bar. The negative terminal of the boost-up converter and a negative terminal of the inverter are also electrically connected with each other by using a bus bar. The allowable current of the bus bar is proportional to the sectional area of the bus bar. For example, when the bus bar has a fixed thickness, the allowable current of the bus bar increases with an increase in the width of the bus bar. A bus bar having an ampacity for an allowable current as the sum of an electric current flowing through the negative terminal of the boost-up converter and an electric current flowing through the negative terminal of the inverter is generally used as the bus bar to connect the negative terminal of the fuel cell with the negative terminal of the boost-up converter. This increases the sectional area of the bus bar used between the negative terminal of the fuel cell and the negative terminal of the boost-up converter and increases the overall dimensions of the bus bar. Increasing the overall dimensions of the bus bar increases the possibility that the bus bar interferes with various components and members included in the fuel cell and in the boost-up converter. In order to prevent such an interference, there is a need for increasing the spaces between the respective components and members in the layout. This causes a problem of increasing the overall space required for the layout of the fuel cell system.

SUMMARY

According to one aspect of the disclosure, there is provided a bus bar used for a fuel cell system. The fuel cell system comprises a fuel cell; an FC boost-up converter configured by a DC-DC converter to boost up a voltage output from the fuel cell; and an inverter connected with the FC boost-up converter. The bus bar comprises a first bus bar connected with a negative terminal of the fuel cell; a second bus bar connected with a negative terminal of the PC boost-up converter; and a third bus bard connected with a negative terminal of the inverter. The second bus bar is directly coupled with the first bus bar, and the third bus bar is directly coupled or joined with the first bus bar. The second bus bar is configured to have a smaller sectional area than a sectional area of the first bus bar.

DETAILED DESCRIPTION

A. Embodiment

Figure 1:
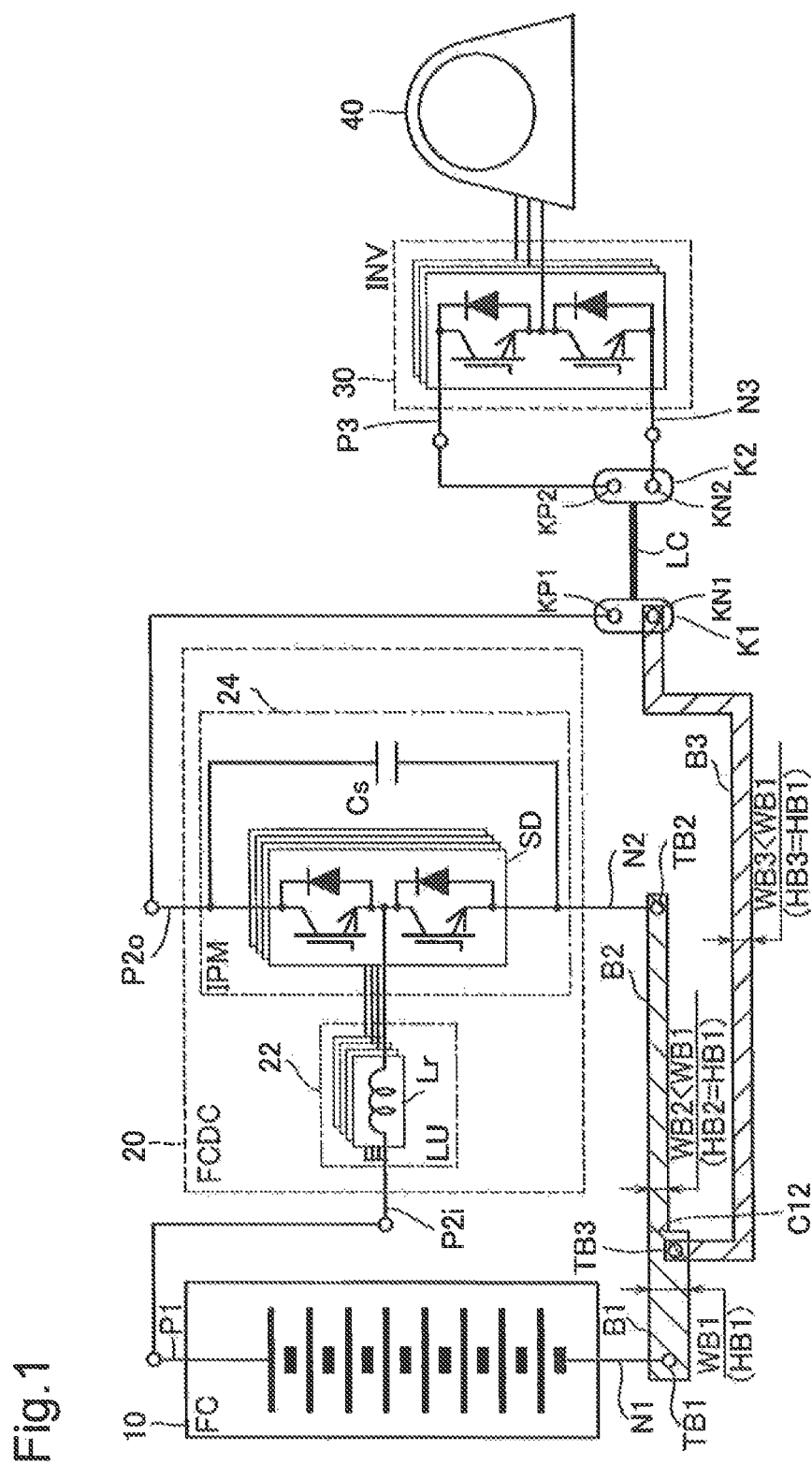
FIG. 1 is a diagram illustrating the schematic configuration of a fuel cell system according to one embodiment.

FIG. 1 is a diagram illustrating the schematic configuration of a fuel cell system according to one embodiment. This fuel cell system is a fuel cell system mounted on a fuel cell vehicle provided as an example. The fuel cell system is, however, not limited to this example but may be a stationary fuel cell system.

The fuel cell system includes a fuel cell (expressed as "FC" in the drawing) 10, an FC boost-up converter (expressed as "FCDC" in the drawing) 20, an inverter (expressed as "INV" in the drawing) 30, and a drive motor 40.

The fuel cell 10 is a power generation device having a stack structure configured by stacking a plurality of unit cells in series. Each unit cell includes a membrane electrode assembly (not shown) as a power generation element configured to generate electric power by an electrochemical reaction of a fuel gas and an oxidizing gas. The fuel cell system also includes various devices used to make the fuel cell 10 serve as the power generation device, for example, a fuel gas supply device, an oxidizing gas supply device and a cooling device. These devices are, however, not specifically characteristic of the present disclosure, so that their illustration and description are omitted.

The FC boost-up converter 20 may be, for example, a multi-phase boost-up DC-DC converter having a plurality of drive phases (for example, four drive phases) and a smoothing capacitor Cs and is a circuit configured to boost up a voltage output from the fuel cell 10. In another example, the FC boost-up converter 20 may be a single-phase boost-up DC-DC converter having only one drive phase. One drive phase is configured by a boost-up chopper circuit including a reactor Lr and a switching device SD. A plurality of reactors included in one reactor unit (expressed as "LU" in the drawing) 22 are used as the reactors Lr of the respective drive phases. A plurality of switching devices and a smoothing capacitor included in a semiconductor element power module 24 that is called IPM (intelligent power module) are used as the switching devices SD of the respective drive phases and the smoothing capacitor Cs. In the description below, the semiconductor element power module 24 is called "IPM 24".

The inverter 30 is a drive circuit configured to convert a DC power supplied from the FC boost-up converter 20 into an AC power and supply the AC power to the drive motor 40. The drive motor 40 is configured to drive wheels (not shown) with the AC power supplied from the inverter 30. The inverter 30 is configured to supply AC power of a phase number that is determined according to the type of a motor employed for the drive motor 40, to the drive motor 40. For example, when a synchronous motor including three-phase coils is employed as the drive motor 40, the inverter 30 serves to supply three-phase AC power to the drive motor 40.

A positive terminal P1 of the fuel cell 10 is electrically connected with an input-side positive terminal P2$i$ of the FC boost-up converter 20. The respective reactors Lr of the reactor unit 22 are electrically connected in parallel with the positive terminal P2$i$. An output-side positive terminal P2$o$ of the FC boost-up converter 20 is electrically connected with a positive terminal P3 of the inverter 30 via a positive terminal KP1 of a first connector K1, a cable LC and a positive terminal KP2 of a second connector K2.

A negative terminal N1 of the fuel cell 10, a negative terminal N2 of the FC boost-up converter 20 and a negative terminal N3 of the inverter 30 are electrically connected as described below. More specifically, the negative terminal N1 of the fuel cell 10 is electrically connected with a first bus bar B1 at a connection point TB1 that is provided on one end of the first bus bar B1. The negative terminal N2 of the FC boost-up converter 20 is electrically connected with a second bus bar B2 at a connection point TB2 that is provided on one end of the second bus bar B2. The negative terminal N3 of the inverter 30 is electrically connected with one end of a third bus bar B3 via a negative terminal KN2 of the second connector K2, the cable LC and a negative terminal KN1 of the first connector K1.

An opposite end of the second bus bar B2 that is opposite to the end having the connection point TB2 and an opposite end of the first bus bar B1 that is opposite to the end having the connection point TB1 are directly coupled or joined with each other at a coupling region C12, so that the first bus bar B1 and the second bus bar B2 are electrically connected with each other. The third bus bar B3 is directly coupled or joined with and is thereby electrically connected with the first bus bar B1 at a connection point TB3 that is provided on a first bus bar B1-side in the vicinity of the coupling region C12 between the first bus bar B1 and the second bus bar B2. This configuration results in providing electrical connection of the negative terminal N1 of the fuel cell 10, the negative terminal N2 of the FC boost-up converter 20 and the negative terminal N3 of the inverter 30. The first bus bar B1 and the second bus bar B2 are coupled with each other by integrally forming the first bus bar B1 and the second bus bar B2. The first bus bar B1 and the third bus bar B3 are coupled with each other at the connection point TB3 by means of a clamping member (not shown) such as a bolt.

The three bus bars B1, B2 and B3 are respectively formed to have rectangular cross sections. In the description below, among the dimensions of the respective sides of the cross sections of the respective bus bars B1, B2 and B3, the smaller dimension is called "thickness" and the greater dimension is called "width". In FIG. 1, the dimension in a direction perpendicular to the sheet surface corresponds to the "thickness", and the dimension in a direction parallel to the sheet surface corresponds to the "width".

According to the embodiment, a thickness HB1 of the first bus bar B1, a thickness HB2 of the second bus bar B2 and a thickness HB3 of the third bus bar B3 are set equal to one another. A width WB2 of the second bus bar B2 and a width WB3 of the third bus bar B3 are respectively set smaller than a width WB1 of the first bus bar B1. Accordingly, the second bus bar B2 is formed in such a configuration that has a smaller sectional area (WB2·HB2) than a sectional area (WB1·HB1) of the first bus bar B1. The third bus bar B3 is also formed in such a configuration that has a smaller sectional area (WB3·HB3) than the sectional area (WB1·HB1) of the first bus bar B1.

Figure 2:
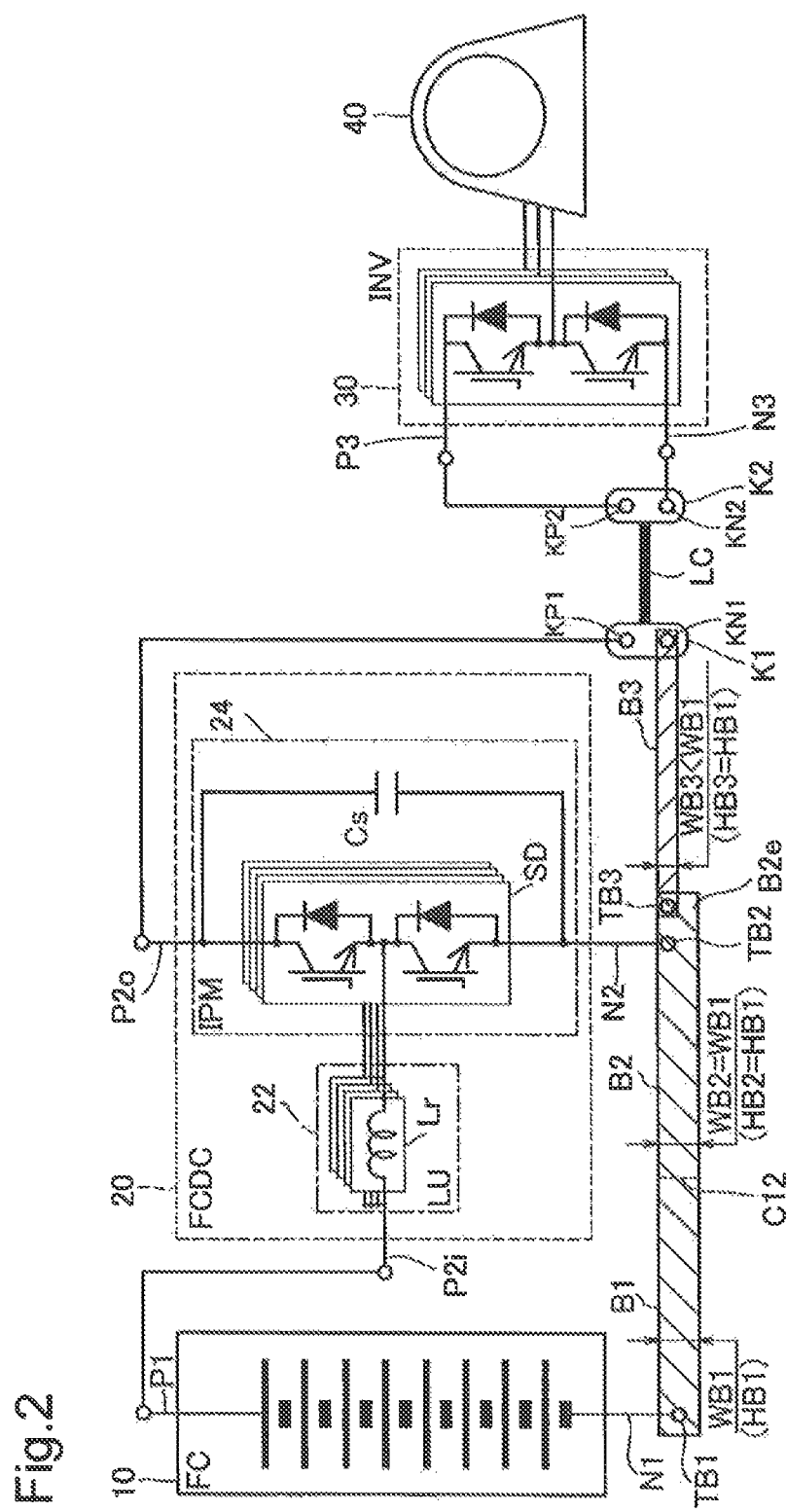
FIG. 2 is a diagram illustrating the schematic configuration of a fuel cell system according to a comparative example.

FIG. 2 is a diagram illustrating the schematic configuration of a fuel cell system according to a comparative example. The fuel cell system of the comparative example differs from the fuel cell system of the embodiment by the electrical connection of the negative terminal N1 of the fuel cell 10, the negative terminal N2 of the FC boost-up converter 20 and the negative terminal N3 of the inverter 30, as described below. According to the embodiment, as shown in FIG. 1, the third bus bar B3 is connected in series with the first bus bar B1 and is electrically connected with the first bus bar B1 at the connection point TB3 with the first bus bar B1, which is provided in the vicinity of the coupling region C12 between the first bus bar B1 and the second bus bar B2. According to the comparative example, on the other hand, as shown in FIG. 2, a third bus bar B3 is directly coupled or joined with and is thereby electrically connected with a second bus bar B2 at a connection point TB3 with an end B2$e$ of the second bus bar B2, which is provided on the opposite side to a coupling region C12 between a first bus bar B1 and the second bus bar B2 with respect to a connection point TB2 with the negative terminal N2 of the FC boost-up converter 20. According to the comparative example, the second bus bar B2 connected with the negative terminal N2 of the FC boost-up converter 20 is configured to have a width WB2 and a thickness HB1 that are respectively equal to a width WB1 and a thickness HB1 of the first bus bar B1 connected with the negative terminal N1 of the fuel cell 10, and the first bus bar B1 and the second bus bar B2 are formed integrally. The comparative example thus differs from the embodiment by that the width WB2 of the second bus bar B2 is set equal to the width WB1 of the first bus bar B1 according to the comparative example, while the width WB2 of the second bus bar B2 is set smaller than the width WB1 of the first bus bar B1 according to the embodiment.

Figure 3:
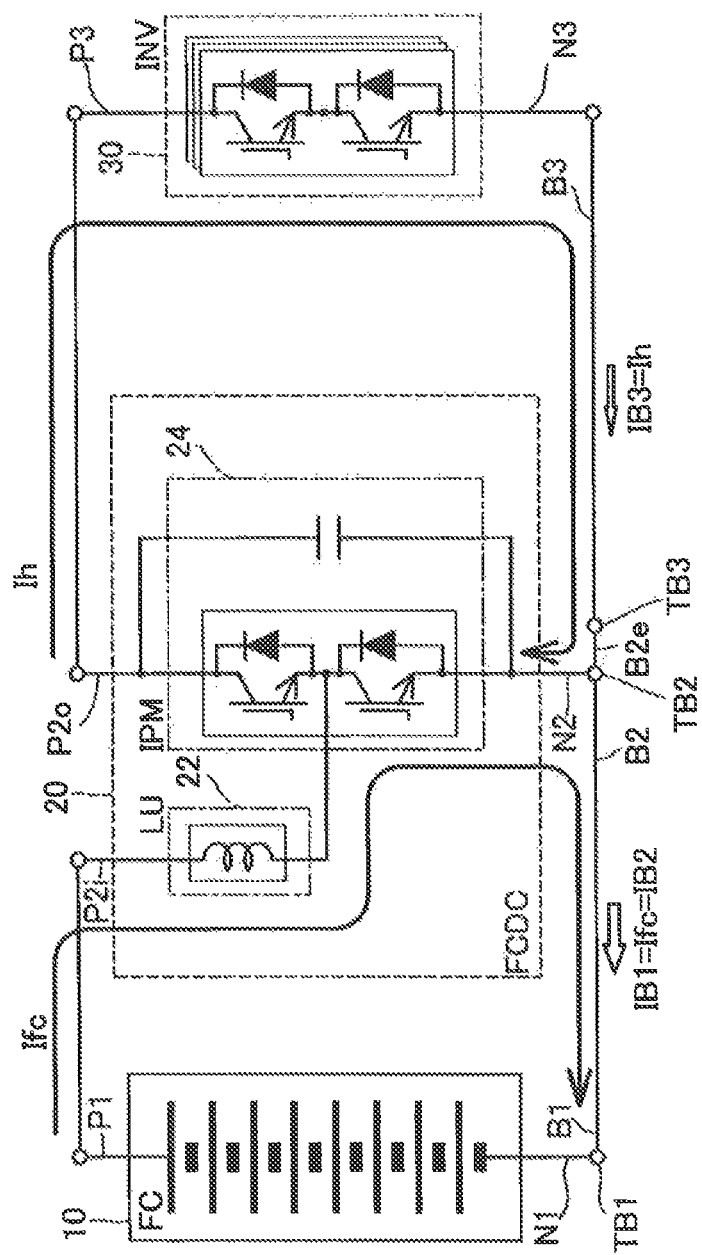
FIG. 3 is a diagram illustrating electric currents flowing through first to third bus bars in the fuel cell system of the comparative example.
Figure 4:
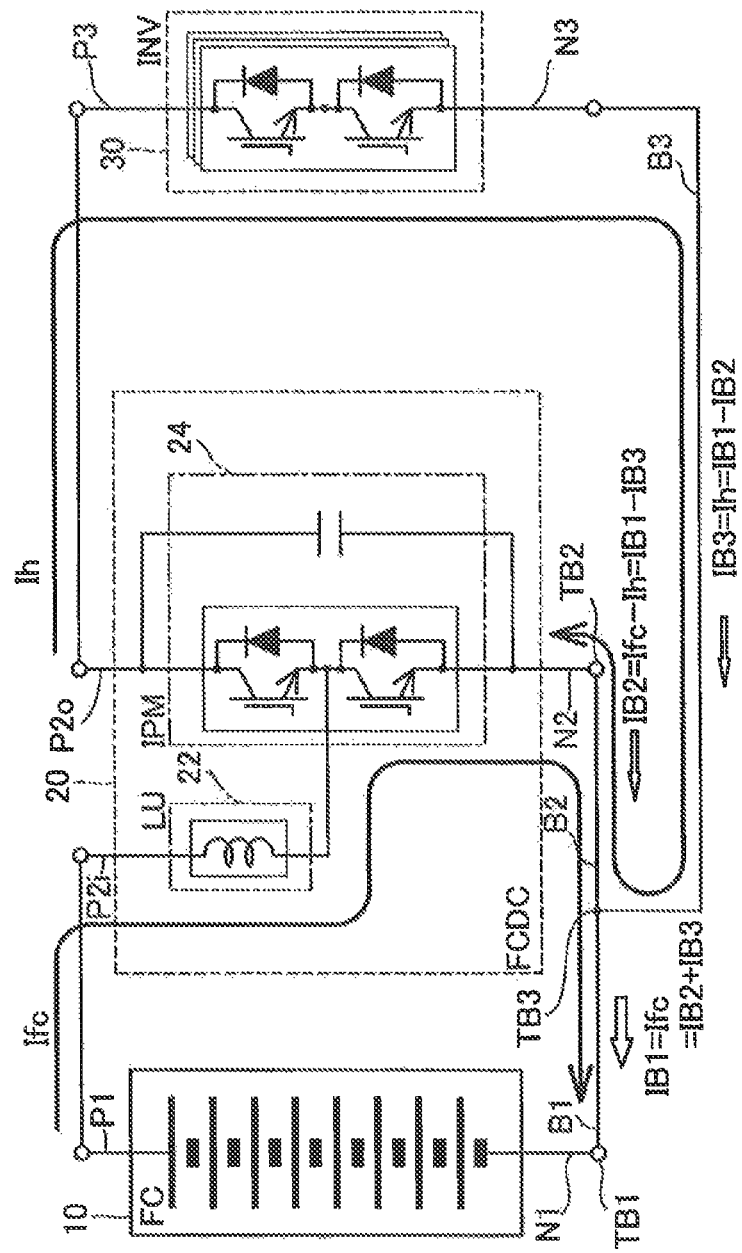
FIG. 4 is a diagram illustrating electric currents flowing through first to third bus bars in the fuel cell system of the embodiment.

FIG. 3 is a diagram illustrating electric currents flowing through the bus bars in the fuel cell system of the comparative example. FIG. 4 is a diagram illustrating electric currents flowing through the bus bars in the fuel cell system of the embodiment. For convenience of explanation, the connectors K1 and K2 and the cable LC placed between the third bus bar B3 and the inverter 30 are omitted from the illustrations of FIGS. 3 and 4, and the respective bus bars are expressed by solid lines in FIGS. 3 and 4. The following description is on the assumption that there is no loss in each of the circuits.

As shown in FIG. 3, according to the comparative example, a cell output current Ifc that is supplied from the positive terminal P1 of the fuel cell 10 to the FC boost-up converter 20 flows through the input-side positive terminal P2$i$ and the negative terminal N2 of the FC boost-up converter 20, subsequently flows from the connection point TB2 to the second bus bar B2 and the first bus bar B1 and then returns from the connection point TB1 to the negative terminal N1 of the fuel cell 10. A converter output current Ih that is supplied from the output-side positive terminal P2$o$ of the FC boost-up converter 20 to the inverter 30 flows through the positive terminal P3 and the negative terminal N3 of the inverter 30 to the third bus bar B3, subsequently flows from the connection point TB3 with the second bus bar B2 to the end B2e of the second bus bar B2 and then returns from the connection point TB2 to the negative terminal N2 of the FC boost-up converter 20. Accordingly a second bus bar current IB2 flowing through the second bus bar B2 toward the first bus bar B1 and a first bus bar current IB1 flowing through the first bus bar B1 are both equal to the cell output current Ifc. According to the comparative example, the width WB2 and the thickness HB2 of the second bus bar B2 are required to be equal to the width WB1 and the thickness HB1 of the first bus bar B1, in order to make the sectional area (WB2·HB2) of the second bus bar B2 equal to the sectional area (WB1·HB1) of the first bus bar B1.

As shown in FIG. 4, according to the embodiment, on the other hand, the converter output current Ih that is supplied from the output-side positive terminal P2o of the FC boost-up converter 20 to the inverter 30 flows through the positive terminal P3 and the negative terminal N3 of the inverter 30 to the third bus bar B3. The converter output current Ih flows through the third bus bar B3, subsequently flows from the connection point TB3 with the first bus bar B1 toward the second bus bar B2 in a direction reverse to the cell output current Ifc and then returns from the connection point TB2 to the negative terminal N2 of the FC boost-up converter 20. Accordingly a second bus bar current IB2 flowing through the second bus bar B2 is equal to a difference (Ifc−Ih) between the cell output current Ifc and the converter output current Ih and is, in other words, equal to a difference (IB1−IB3) between a first bus bar current IB1 and a third bus bar current IB3. This configuration makes the sectional area (WB2·HB2) of the second bus bar B2 smaller than the sectional area (WB1·HB1) of the first bus bar B1. According to the embodiment, as shown in FIG. 1, the sectional area (WB2·HB2) of the second bus bar B2 is made smaller than the sectional area (WB1·HB1) of the first bus bar B1 by setting the thickness HB2 of the second bus bar B2 equal to the thickness HB1 of the first bus bar B1 and setting the width WB2 of the second bus bar B2 smaller than the width WB1 of the first bus bar B1. According to the comparative example shown in FIG. 3 (and FIG. 2), the first bus bar B1 and the second bus bar B2 are substantially formed by a single bus bar. Comparison of the drawings indicates that the embodiment shown in FIG. 4 (and FIG. 1) apparently has a greater number of bus bars. Comparison of the drawings also indicates that the third bus bar B3 of the embodiment is apparently longer than the third bus bar B3 of the comparative example. These apparent differences are, however, attributed to only the convenience of illustration. Actually, the sectional area of the second bus bar B2 in the comparative example may be decreased to the sectional area in the embodiment by simply changing the positions of the connection points TB2 and TB3. There are no substantial differences in the number of bus bars and in the length of the third bus bar B3 between the embodiment and the comparative example.

The third bus bar current IB3 flowing through the third bus bar B3 is equal to the converter output current Ih and is, in other words, equal to a difference (IB1−IB2) between the first bus bar current IB1 and the second bus bar current IB2. Like the second bus bar B2, this configuration makes the sectional area (WB3·HB3) of the third bus bar B3 smaller than the sectional area (WB1·HB1) of the first bus bar B1. According to the embodiment, as shown in FIG. 1, the sectional area (WB3·HB3) of the third bus bar B3 is made smaller than the sectional area (WB1·HB1) of the first bus bar B1 by setting the thickness HB3 of the third bus bar B3 equal to the thickness HB1 of the first bus bar B1 and setting the width WB3 of the third bus bar B3 smaller than the width WB1 of the first bus bar B1.

Figure 5:
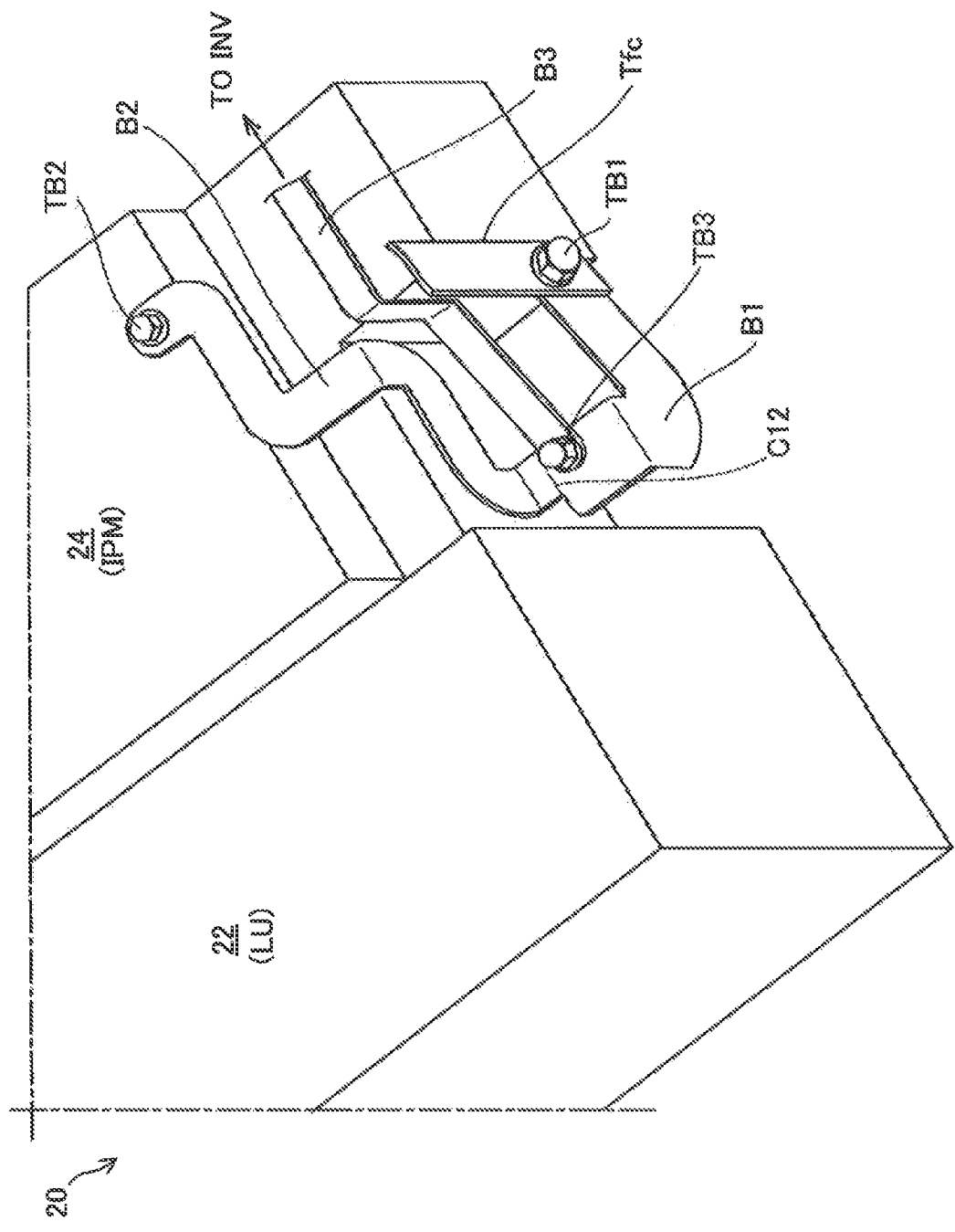
FIG. 5 is a diagram illustrating one example of an apparatus on which the first to the third bus bars are mounted.

FIG. 5 is a diagram illustrating one example of an apparatus on which the bus bars are mounted. As shown in FIG. 5, the coupling region C12 between the first bus bar B1 and the second bus bar B2, the connection point TB1 of the first bus bar B1 with a terminal Tf1 corresponding to the negative terminal N1 of the fuel cell 10, and the connection point TB3 of the first bus bar B1 with the third bus bar B3 are placed in a void space provided by the layout of the reactor unit 22 and the IPM 24 included in the FC boost-up converter 20. The second bus bar B2 is bent and folded along the void space and is electrically connected with the IPM 24 of the FC boost-up converter 20 at the connection point TB2.

As shown in FIG. 5, the configuration of the bus bars according to the embodiment reduces the dimensions of the second bus bar B2 and thereby reduces the overall dimensions of the bus bars. Reducing the dimensions of the second bus bar B2 also enhances the flexibility of arrangement of the second bus bar B2. This configuration thus reduces the conventional need for increasing the spaces between respective components and members in the layout, for the purpose of preventing the bus bar from interfering with the peripheral components and members. This configuration also reduces the dimensions of the third bus bar B3 and thereby further reduces the overall dimensions of the bus bars. Reducing the dimensions of the third bus bar B3 similarly enhances the flexibility of arrangement of the third bus bar B3. This configuration thus further reduces the conventional need for increasing the spaces between the respective components and members in the layout, for the purpose of preventing the bus bar from interfering with the peripheral components and members.

B. Modifications (1) According to the above embodiment, the thicknesses HB1 to HB3 of the three bus bars B1 to B3 are set equal to one another. The width WB2 of the second bus bar B2 is set smaller than the width WB1 of the first bus bar B1, and the width WB3 of the third bus bar B3 is also set smaller than the width WB1 of the first bus bar B1. This configuration is, however, not restrictive. According to a modification, the widths WB1 to WB3 of the respective bus bars B1 to B3 may be set equal to one another. The thickness HB2 of the second bus bar B2 may be set smaller than the thickness HB1 of the first bus bar B1, and the thickness HB3 of the third bus bar B3 may also be set smaller than the thickness HB1 of the first bus bar B1. According to another modification, both the width WB2 and the thickness HB2 of the second bus bar B2 may be set smaller than the width WB1 and the thickness HB1 of the first bus bar B1, and both the width WB3 and the thickness HB3 of the third bus bar B3 may also be set smaller than the width WB1 and the thickness HB1 of the first bus bar B1. It is thus basically required that the sectional area (WB2·HB2) of the second bus bar B2 is made smaller than the sectional area (WB1·HB1) of the first bus bar B1 and that the sectional area (WB3·HB3) of the third bus bar B3 is also made smaller than the sectional area (WB1·HB1) of the first bus bar B1. The configuration of setting the thicknesses of the bus bars equal to one another and changing their widths is, however, desirable to readily form the three bus bars B1 to B3 from one single plate material.

(2) According to the above embodiment, the first bus bar B1 and the second bus bar B2 are provided as integrally formed bus bars. According to a modification, the first bus bar B1 and the second bus bar B2 may be provided as separate bus bars and may be electrically connected with each other by coupling the ends of the bus bars B1 and B2 with each other by means of a clamping member such as a bolt.

(3) According to the above embodiment, the third bus bar B3 is provided as a different bus bar separate from the first bus bar B1. According to a modification, the third bus bar B3 may be formed integrally with the first bus bar B1, like the second bus bar B2. In other words, all the three bus bars B1 to B3 may be formed integrally. This configuration reduces the impedance of connection between the first bus bar B1 and the third bus bar B3.

C. Other Aspects

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to one aspect of the disclosure, there is provided a bus bar used for a fuel cell system. The fuel cell system comprises a fuel cell; an FC boost-up converter configured by a DC-DC converter to boost up a voltage output from the fuel cell; and an inverter connected with the FC boost-up converter. The bus bar comprises a first bus bar connected with a negative terminal of the fuel cell; a second bus bar connected with a negative terminal of the FC boost-up converter; and a third bus bard connected with a negative terminal of the inverter. The second bus bar is directly coupled or joined with the first bus bar, and the third bus bar is directly coupled or joined with the first bus bar. The second bus bar is configured to have a smaller sectional area than a sectional area of the first bus bar.

An electric current flowing through the second bus bar is equal to a difference between an electric current that is supplied from the fuel cell to the FC boost-up converter, flows from the negative terminal of the FC boost-up converter through the second bus bar and the first bus bar and returns to the negative terminal of the fuel cell and an electric current that is supplied from the FC boost-up converter to the inverter, flows from the negative terminal of the inverter through the third bus bar and the second bus bar and returns to the negative terminal of the FC boost-up converter, i.e., a difference between an electric current flowing through the first bus bar and an electric current flowing through the third bus bar. This configuration makes the sectional area of the second bus bar connected with the FC boost-up converter smaller than the sectional area of the first bus bar connected with the fuel cell and thereby reduces the overall dimensions of the bus bar. This configuration reduces the need for increasing the spaces between respective components and members in the layout, for the purpose of preventing the bus bar from interfering with various components and members included in the fuel cell and the FC boost-up converter, and thereby reduces the overall space required for the layout of the fuel cell system.

(2) In the bus bar of the above aspect, the third bus bar may be configured to have a smaller sectional area than the sectional area of the first bus bar.

This configuration further reduces the overall dimensions of the bus bar.

(3) In the bus bar of the above aspect, the first bus bar and the second bus bar may be formed integrally.

According to this aspect, the first bus bar and the second bus bare are formed integrally. This configuration reduces the impedance of connection between the first bus bar and the second bus bar, compared with a configuration that the first bus bare and the second bus bar are provided as separate bus bars and are coupled with each other by means of a clamping member such as a bolt.

The present disclosure may be implemented by any of various aspects other than the bus bar used for the fuel cell system described above, for example, a fuel cell system including the bus bar.

What is claimed is:

1. A bus bar system used for a fuel cell system,
the fuel cell system comprising a fuel cell; an FC boost-up converter configured by a DC-DC converter to boost up a voltage output from the fuel cell; and an inverter connected with the FC boost-up converter,
the bus bar system comprising:
a first bus bar connected with a negative terminal of the fuel cell;
a second bus bar connected with a negative terminal of the FC boost-up converter; and
a third bus bard connected with a negative terminal of the inverter, wherein
the second bus bar is directly coupled with the first bus bar,
the third bus bar is directly coupled with the first bus bar, and
the second bus bar is configured to have a smaller sectional area than a sectional area of the first bus bar.

2. The bus bar system according to claim 1, wherein the third bus bar is configured to have a smaller sectional area than the sectional area of the first bus bar.

3. The bus bar system according to claim 1, wherein the first bus bar and the second bus bar are formed integrally.

* * * * *